Feb. 10, 1953  F. M. CHRISTIAN  2,627,716
VEHICLE INTERMITTENT COMBUSTION TYPE POWER PLANT
Filed Dec. 12, 1947  4 Sheets-Sheet 2

INVENTOR.
FRANK M. CHRISTIAN,
BY Lyon & Lyon
ATTORNEYS.

Feb. 10, 1953 F. M. CHRISTIAN 2,627,716
VEHICLE INTERMITTENT COMBUSTION TYPE POWER PLANT
Filed Dec. 12, 1947 4 Sheets-Sheet 3
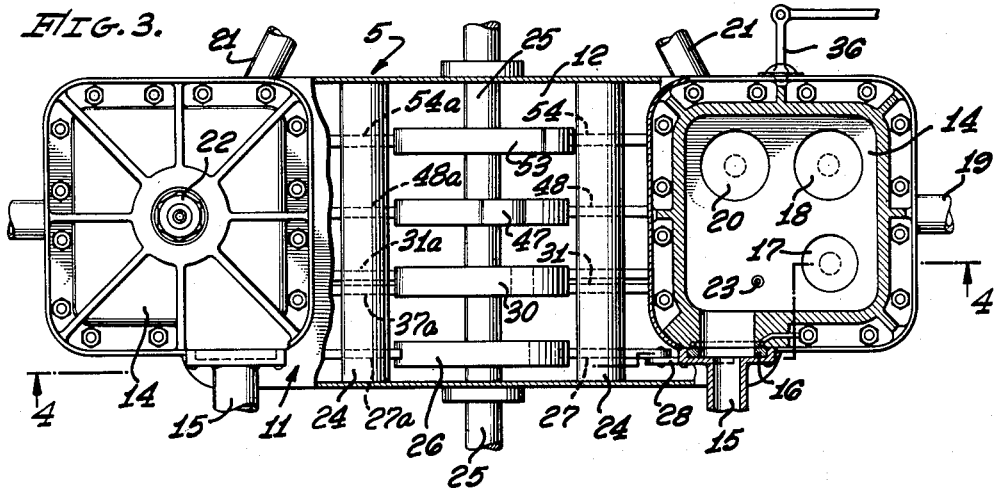
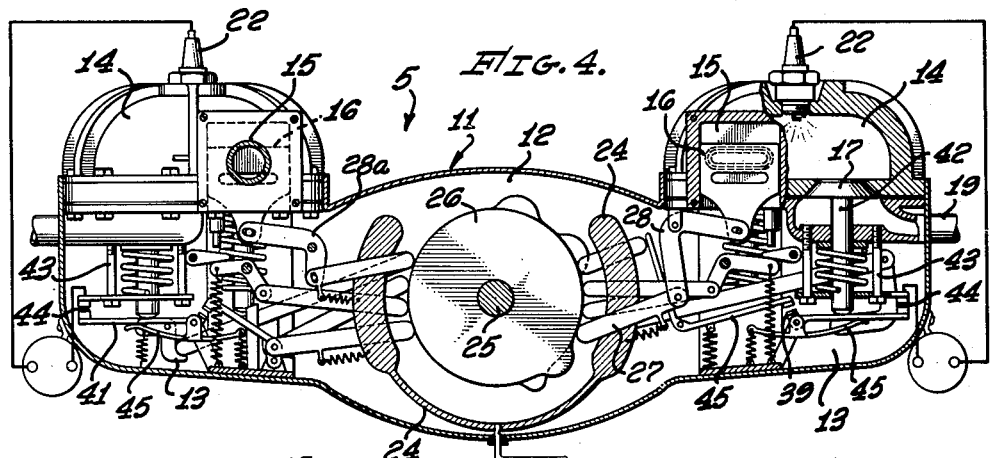
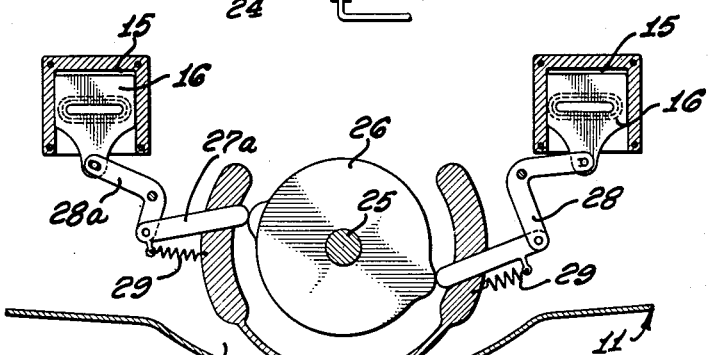
INVENTOR.
FRANK M. CHRISTIAN,
BY Lyon & Lyon
ATTORNEYS.

Feb. 10, 1953   F. M. CHRISTIAN   2,627,716
VEHICLE INTERMITTENT COMBUSTION TYPE POWER PLANT
Filed Dec. 12, 1947   4 Sheets-Sheet 4
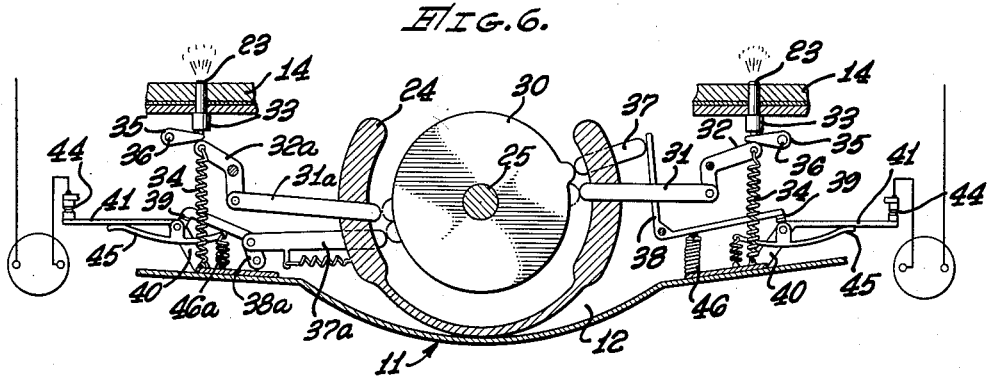
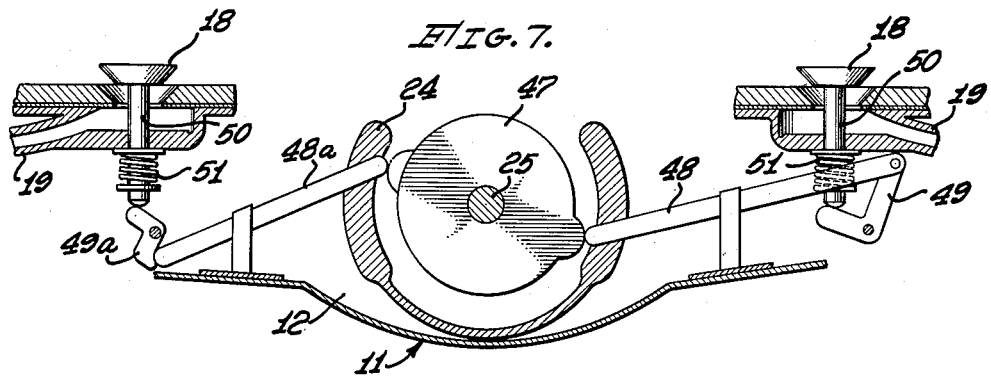
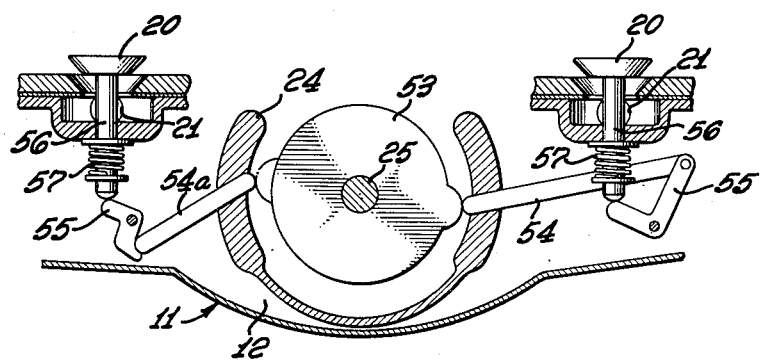
INVENTOR.
FRANK M. CHRISTIAN,
BY Lyon & Lyon
ATTORNEYS.

Patented Feb. 10, 1953

2,627,716

UNITED STATES PATENT OFFICE 2,627,716

VEHICLE INTERMITTENT COMBUSTION TYPE POWER PLANT

Frank M. Christian, Ventura, Calif.

Application December 12, 1947, Serial No. 791,440

6 Claims. (Cl. 60—39.8)

My invention relates to vehicle power plants, and included in the object of my invention are:

First, to provide a vehicle power plant wherein fuel is consumed in fixed combustion chambers and the products of combustion employed to drive rotary engines.

Second, to provide a vehicle power plant of this character wherein the combustion chambers may operate initially by spark ignition. Then after such initial period the combustion chambers may be operated by fuel injection.

Third, to provide a vehicle power plant which eliminates pistons or other relatively heavy reciprocating parts and, although operable at wide ranges of speed, does not require a clutch transmission or differential drive.

Fourth, to provide a vehicle power plant, the parts of which are easily accessible for servicing, repair or replacement, which is economic of construction, maintenance, and operation.

With the above and other objects in view which may appear hereinafter, reference is directed to the accompanying drawings, in which:

Figure 3 is an enlarged partial plan partially sectional view of one of the power units, the section being taken approximately along the line 3—3 of Figure 2.

Figure 4 is a transverse sectional view thereof taken approximately along the line 4—4 of Figure 3.

Figure 5 is a fragmentary sectional view similar to Figure 4 showing the mechanism employed to control the compressed air inlet valves.

Figure 6 is a similar partial section view showing the control mechanism for the fuel injection and spark control mechanisms.

Figure 7 is a similar fragmentary sectional view showing the control for the discharge valves.

Figure 8 is another similar partial sectional view showing the controls for the exhaust valves.

Figure 1:
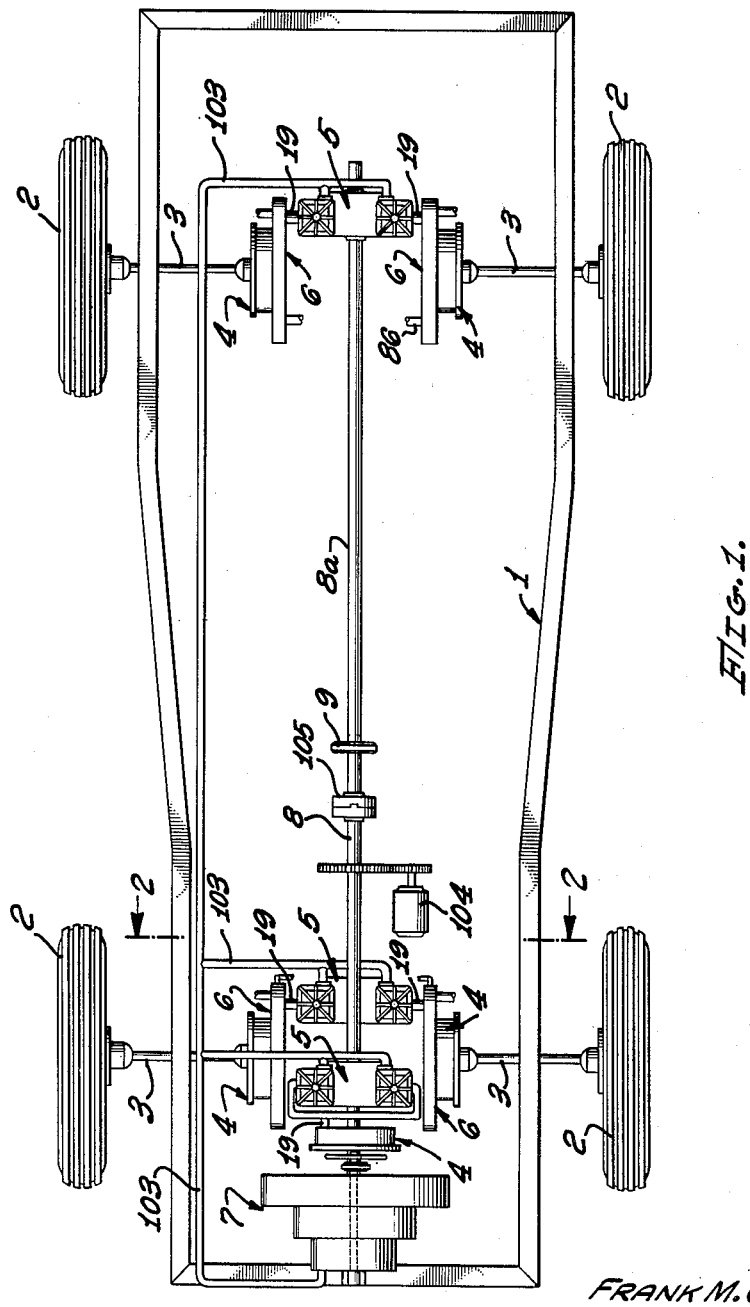
Figure 1 is a diagrammatic plan view of a vehicle chassis showing the elements of my power plant in their relative positions.

My vehicle power plant as herein illustrated is shown as adapted to an automobile. A chassis frame 1 supports four wheels 2 having individual drive axles 3. Each drive axle is connected to a rotary engine 4 which may be any type of operation by compressed fluids and, for the purposes of this invention, may be considered as conventional. The rotary engines are actuated by compressed fluid supplied from power units 5. Suitable control valves 6 mounted on the sides of the rotary engines regulate the supply. In the structure as shown in Figure 1 a power unit is provided for each pair of rotary engines associated with the front and rear wheels of the vehicle. A third power unit 5 and an associated rotary engine 4 is employed to drive a compressor 7, these being mounted on a common shaft 8. A chain drive 9 connects shaft 8 with a second shaft 8a extending between the power units 5 associated with the vehicle wheels.

Each power unit 5 comprises a casing 11 which forms a central cam chamber 12. Lateral cavities 13 extend from opposite sides of the cam chamber 12 and house control mechanisms. The upper walls of these cavities are closed by the lower walls of combustion chambers 14.

Each combustion chamber is provided with a compressed air inlet 15 controlled by a slide valve 16. Set in the lower wall of each combustion chamber is a pressure operated discharge valve 17 and mechanically operated discharge valve 18. Passageways controlled by these valves are manifolded and connect to a motive fluid conduit 19 which extends from the power unit to a corresponding rotary engine 4 and its control valve 6.

Each combustion chamber is also equipped with an exhaust valve 20 communicating with an exhaust line 21. Mounted in the head of each combustion chamber is a spark plug 22. Suitably positioned in the bottom wall of each combustion chamber is an injector nozzle 23.

The cam chamber 12 receives a cam guide frame 24 which is substantially semi-cylindrical, that is, closed except for its upper portion and having side walls which are thickened and appropriately slotted to receive cam followers to be described hereinafter. Centered within the frame 24 is a cam shaft 25 which is connected with or made integral with the shafts 8 or 8a mentioned hereinbefore. As shown best in Figure 5, each cam shaft is provided with an air intake cam 26 against which bears a pair of diametrically opposed cam followers 27 and 27a guided by the frame 24. The outer extremity of the cam followers 27 and 27a engage, respectively, bell cranks 28 and 28a which, in turn, are connected to corresponding slide valve 16. A spring 29 functions to hold each cam follower against the cam 26.

Figure 9:
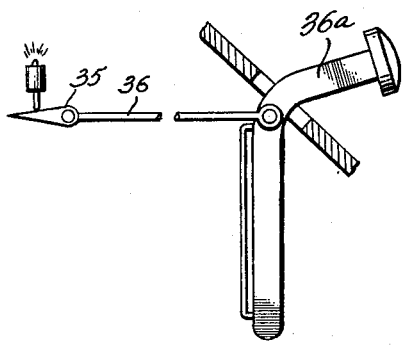
Figure 9 is a fragmentary, essentially diagrammatical view of a foot control for the fuel injection means.

Adjacent to the cam 26 is a spark and injector control cam 30, as shown best in Figure 6, which is engaged by diametrically opposed cam followers 31 and 31a. The cam followers actuate levers 32 and 32a which, in turn, actuate fuel injector valves 33 associated with the fuel injector nozzles 23. Springs 34 hold the cam followers against the cam 30. Interposed between the levers 32 and 32a and their respective fuel injector valves 33 are volume control wedge members 35. These are mounted on suitable operating shafts 36 and are subjected to manual control, as by a foot pedal 36a shown in Figure 9.

The cam 30 is also engaged by cam followers 37 and 37a which are connected to contact arms 38 and 38a, respectively. Each contact arm is provided at its remote extremity with contacts 39, one element of which is carried by a bracket 40. Hinged to each bracket 40 is a secondary contact arm 41.

The pressure operated discharge valve 17 is provided, as shown best in Figure 4, with a stem 42 which is guided by a suitable cage 43 and is adapted to engage the corresponding secondary contact arm 41. The extremity of each secondary contact arm operates contacts 44, one element of which is carried by the arm 41 and the other element of which is fixed to the cage 43. A spring controlled rocker arm 45 tends to maintain closed the secondary contacts 44. Return springs 46 and 46a function to hold cam followers 37 and 37a against the cam 30.

The cam followers 31 and 31a and 37 and 37a ride on different parts of the control cam and are therefore independently actuated.

As shown best in Figure 7, a discharge valve control cam 47 is mounted on the cam shaft 25. This cam shaft is engaged by cam followers 48 and 48a which operate levers 49 and 49a positioned to engage valve stems 50 depending from the discharge valves 18. Springs 51 urge the valves to their closed positions in opposition to the action of the cam.

Also mounted on the cam shaft 25 is an exhaust valve control cam 53 engaged by cam followers 54 and 54a, as shown best in Figure 8. These operate levers 55 and 55a which engage valve stems 56 depending from the exhaust valves 20. Return springs 57 tend to maintain closed the exhaust valves 20.

Figure 2:
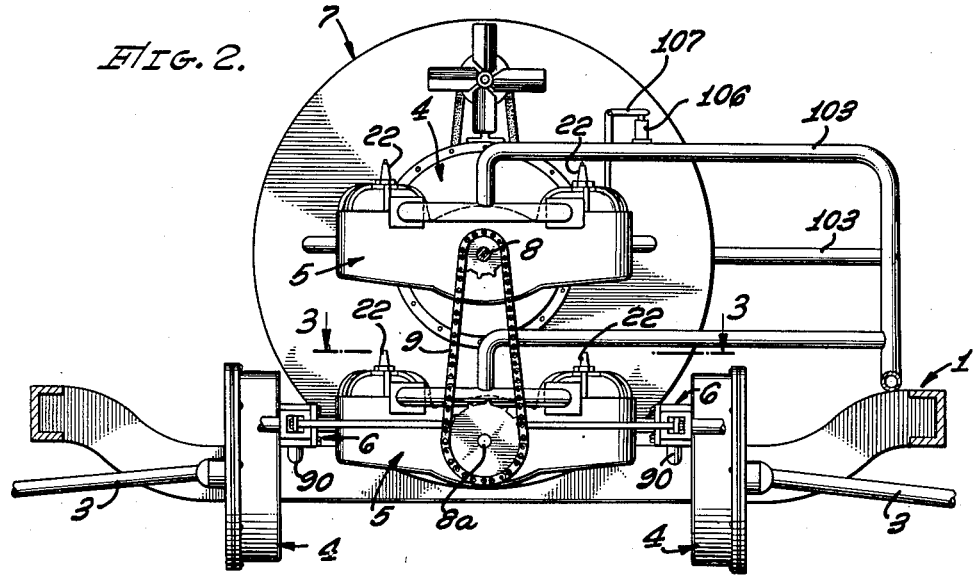
Figure 2 is an enlarged sectional view taken through 2—2 of Figure 1.

If desired, an automatic control may be provided to operate the volume control wedge 35, either to supplement control by foot pedal or to operate automatically when the foot pedal is not used. Such automatic control is suggested in Figure 2 wherein a pressure responsive means 103 is mounted in the branch of the duct 103. Such pressure responsive means comprises a small cylinder communicating with the duct 103, a piston (not shown) subjected to pressure in the duct 103, and a stem. The stem is suitably connected through linkage 107 and through the shaft 36 so that movement of the wedge member 35 is in proportion to the pressure existing in the duct 103.

Having fully described my invention, it is to be understood that I do not wish to be limited to the details herein set forth, but my invention is of the full scope of the appended claims.

I claim:

1. A power unit involving: a pair of fixed combustion chambers; a mechanically operated discharge valve and a pressure responsive discharge valve for each combustion chamber and sharing a common discharge duct; a mechanically operated intake valve for each combustion chamber controlling admission of compressed air thereto; a fuel injector for each combustion chamber; a cam shaft disposed between said combustion chambers; means for rotating said cam shaft; a plurality of cams on said cam shaft; and sets of cam follower and linkage means for operatively connecting said cams with said mechanically operated discharge valve, said intake valve and said injection nozzle respectively, and ignition means for each of said combustion chambers including a spark plug, a first switch, cam means for operating said first switch in timed relation with said intake valve; a second switch in series with the first switch and operatively connected with said pressure responsive discharge valve and and said second switch opening on opening of said pressure responsive valve.

2. A power unit involving: a pair of fixed combustion chambers; a mechanically operated discharge valve and a pressure responsive discharge valve for each combustion chamber and sharing a common discharge duct; a mechanically operated intake valve for for each combustion chamber controlling admission of compressed air thereto; a mechanically operated exhaust valve for each combustion chamber; a fuel injector for each combustion chamber; a cam shaft disposed between said combustion chambers; means for rotating said cam shaft; a plurality of cams on said cam shaft; sets of cam follower and linkage means for operatively connecting said cams with said mechanically operated discharge valve, said exhaust valve, said intake valve and said injector respectively; and ignition means for each of said combustion chambers including a spark plug, a first switch, cam means for operating said first switch in timed relation with said intake valve; a second switch in series with the first switch and operatively connected with said pressure responsive discharge valve and said second switch opening on opening of said pressure responsive valve.

3. A power unit involving: a pair of fixed combustion chambers; a mechanically operated discharge valve and a pressure responsive discharge valve for each combustion chamber and sharing a common discharge duct; a mechanically operated intake valve for each combustion chamber, controlling admission of compressed air thereto; an ignitor for each combustion chamber and a first and second series connected control switch therefor; a fuel injector for each combustion chamber; a cam shaft disposed between said combustion chambers; means for rotating said cam shaft; a plurality of cams on said cam shaft; and sets of cam follower and linkage means for operatively connecting said cam with said mechanically operated discharge valve, said intake valve, said injector and said first ignitor control switches respectively, said second control being operatively associated with said pressure responsive discharge valve to open said ignitor circuit on opening of said valve.

4. A power unit involving: a pair of fixed combustion chambers; a mechanically operated discharge valve and a pressure responsive discharge valve for each combustion chamber and sharing a common discharge duct; a mechanically operated intake valve for each combustion chamber controlling admission of compressed air thereto; an ignitor for each combustion chamber and a control switch therefor; a fuel injector for each combustion chamber; a cam shaft disposed between said combustion chambers; means for rotating said cam shaft; a plurality of cams on said cam shaft; sets of cam follower and linkage means for operatively connecting said cams with said mechanically operated discharge valve, said intake valve, said injector and said ignitor control switch respectively; and a second normally closed ignitor switch in series with each control switch, positioned to be opened by said pressure responsive discharge valve to terminate operation of said ignitor.

5. A power unit as set forth in claim 1 wherein: said cam shaft rotating means is a motor connected with said cam shaft and is operated by a portion of the products of combustion from said combustion chambers; and a compressor for supplying air to said combustion chambers is also operated by said motor.

6. A power unit as set forth in claim 4 wherein: said cam shaft rotating means is a motor connected with said cam shaft and is operated by a portion of the products of combustion from said combustion chambers; and a compressor for supplying air to said combustion chambers is also operated by said motor.

FRANK M. CHRISTIAN.

REFERENCES CITED

The following references are of record in the file of this patent:

UNITED STATES PATENTS

| Number | Name | Date |
| --- | --- | --- |
| 774,771 | Mills et al. | Nov. 15, 1904 |
| 859,235 | Macfarren | July 9, 1907 |
| 939,751 | Schulz | Nov. 9, 1909 |
| 1,001,162 | Parsons et al. | Aug. 22, 1911 |
| 1,015,411 | Webb | Jan. 23, 1912 |
| 1,056,949 | Scott | Mar. 25, 1913 |
| 1,101,794 | Friend | June 30, 1914 |
| 1,242,033 | Painter | Oct. 2, 1917 |
| 1,244,529 | Mehle | Oct. 30, 1917 |
| 1,688,591 | Mitton | Oct. 23, 1928 |
| 1,780,370 | Tenney | Nov. 4, 1930 |
| 2,275,756 | Hanson | Mar. 10, 1942 |

FOREIGN PATENTS

| Number | Country | Date |
| --- | --- | --- |
| 364,942 | France | Aug. 3, 1906 |